INVENTOR.
HOMER J. SHAFER

Nov. 3, 1964 — H. J. SHAFER — 3,155,368
BALL VALVE SEAT CONSTRUCTION
Filed June 28, 1961 — 3 Sheets-Sheet 3
FIG. 3
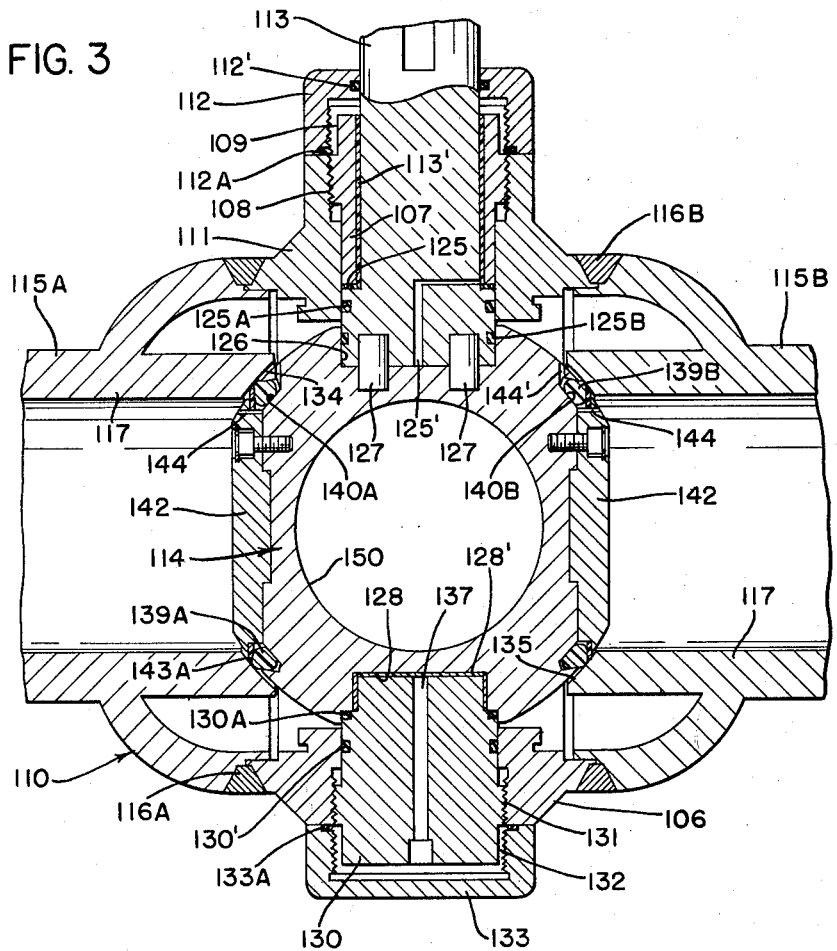
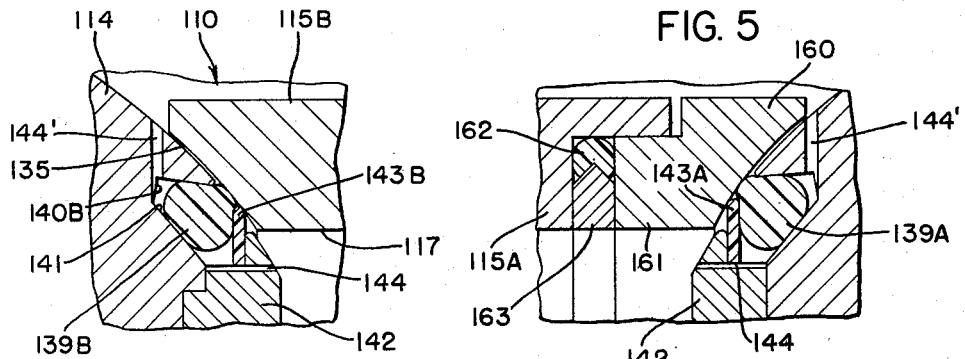
FIG. 4   FIG. 5
INVENTOR.
HOMER J. SHAFER
BY
ATTORNEYS

United States Patent Office 3,155,368
Patented Nov. 3, 1964

3,155,368
BALL VALVE SEAT CONSTRUCTION
Homer J. Shafer, Brookwood Way, Mansfield, Ohio
Filed June 28, 1961, Ser. No. 120,371
9 Claims. (Cl. 251—175)

The invention relates to ball valves and particularly to sealing means for ball valves and the like. Such valves may be of welded construction and in certain prior welded ball valves the seals are either inserted into the body before the valve is welded together or thimbles are screwed into the flow tubes to hold the seals against opposite sides of the ball. Such sealing constructions are disclosed in my Patent No. 2,890,017, issued June 9, 1959.

In a welded ball valve in which the seals are inserted in the body against the ball during assembly, provision must be made for circulating a cooling medium through the valve body around the ball to prevent damage to the seals from the heat of the welding operation. This usually required tack welding the joints to make them liquid-tight, and then circulating the cooling medium while completing the welding operation.

In a welded ball valve in which the seals are inserted in the body after the welding operation and held against the ball by thimbles screwed into the flow tubes from opposite ends, extra parts are required, accurate fit of the seals against the ball may be sacrificed because of warpage of the parts of the valve body during welding, and for a given size of flow passage the outer dimensions of the valve must be increased.

O-ring type seals for ball valves have been proposed having special retaining rings to hold the ring seals in the valve body while preventing part of the ring from blowing out of its groove as it crosses the ball port during opening and closing. However, in a welded valve such constructions either require circulating a cooling medium around the ball during welding, or require a complicated retaining structure which allows subsequent insertion and replacement of the seals, with a possible loss of sealing effectiveness due to the distortion caused by welding.

The purpose of the present invention is to provide an improved ball valve having a ring seal which is insertable and replaceable after the valve is assembled.

Another object is to provide an improved ring seal which can be inserted or replaced in a welded ball valve after the welding operation with a minimum of retaining means.

A further object is to provide an improved ring seal construction for ball valves which seals around the inlet port of the valve body in closed position of the ball and in which the ring seal is held in its groove by differential pressure when crossing the flow port.

Another object is to provide an improved ring seal construction for ball valves which provides a clearance between the ball and the body seating surfaces at all times.

A still further object is to provide an improved welded ball valve construction having a trunnion-mounted ball and ring seals in the ball replaceable after the welding operation.

These and other objects are accomplished by the novel ball valve seal construction of the present invention, preferred embodiments of which are shown by way of example in the accompanying drawings and described in detail in the following specification as representing the best known mode of achieving the purposes of the invention. Various changes and modifications are contemplated within the scope of the appended claims.

Referring to the drawings:

FIG. 3 is a view similar to FIG. 1 of another form of the ball valve with a modified form of the improved O-ring sealing construction.

FIG. 4 is an enlarged fragmentary sectional view of the sealing construction of FIG. 3.

FIG. 5 is an enlarged fragmentary sectional view showing a modified seating construction abutting the O-ring seal.

FIG. 6 is a sectional view similar to FIG. 1 of a ball valve having a floating ball and embodying another modified form of improved O-ring sealing construction.

Figure 1:
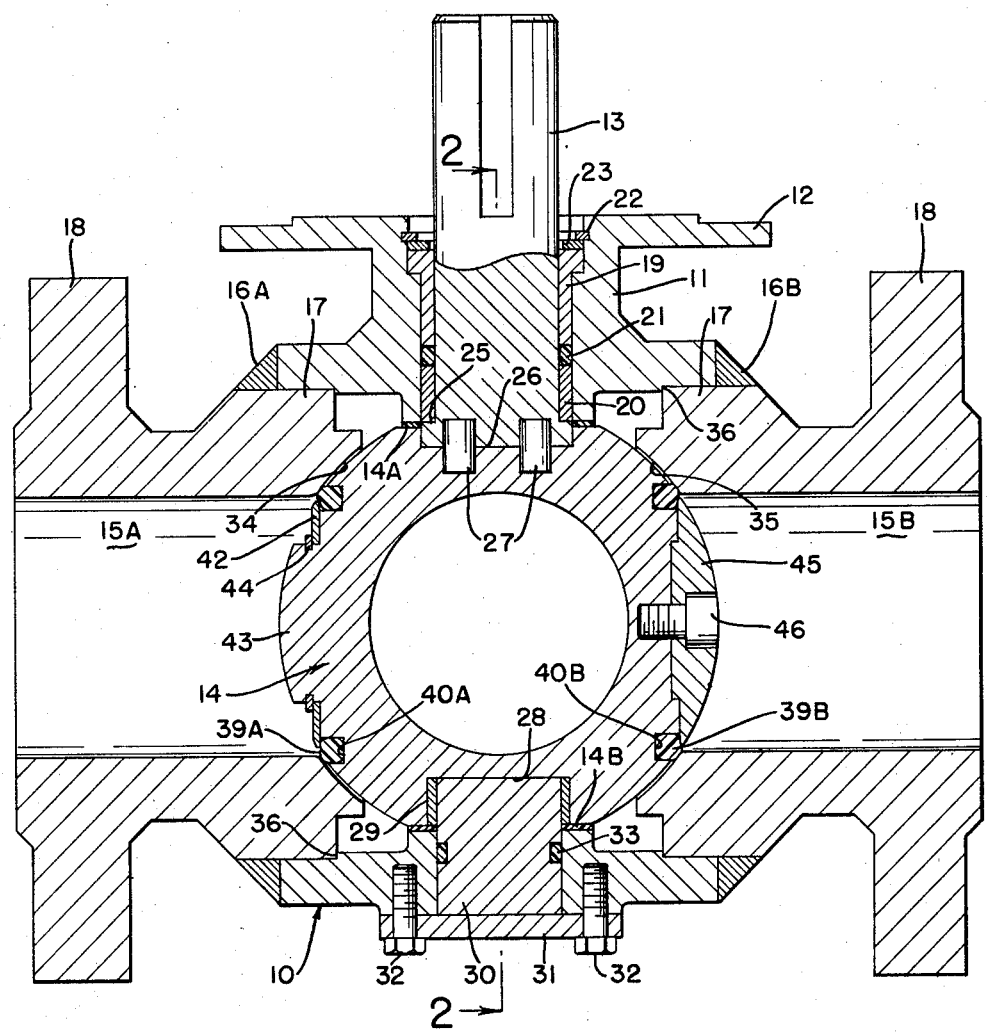
FIG. 1 is a longitudinal sectional view of a ball valve having a trunnion-mounted ball and embodying one form of the improved O-ring sealing construction, the ball being shown in fully closed position.
Figure 2:
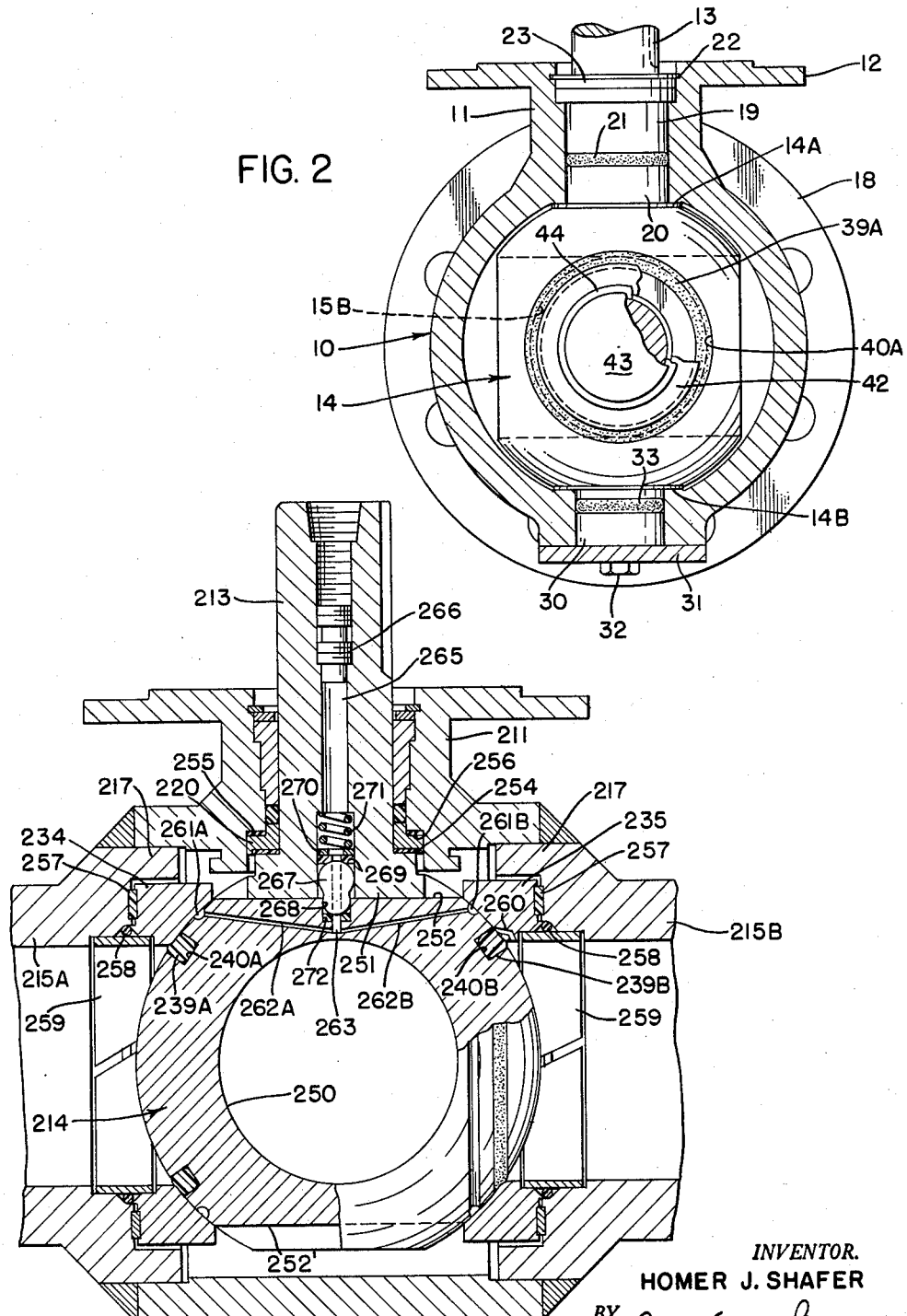
FIG. 2 is a transverse sectional view thereof, showing the ball in elevation, with parts broken away.

The valve body preferably comprises a central tube 10 having a laterally extending valve stem tube 11 with an exterior annular mounting flange 12 for supporting a hydraulic motor which rotates the valve stem 13 of the ball shut-off 14, and the stem is journaled in the tube 11.

Flow tubes 15A and 15B, having their axes coincident with the axis of central tube 10, are telescoped in the ends of tube 10 and welded thereto at 16A and 16B, respectively, to make an integral body. The tubes 15A and 15B have flange portions 17 at their inner ends fitting within the tube 10, and preferably have annular attaching flanges 18 at their outer ends for connection to similar attaching flanges on the pipes in the line in which the valve is connected.

Preferably, the valve stem 13 is journaled in tube 11 in a gland bushing 19 and an inner bushing 20, both of which may be of suitable bearing material. An O-ring seal 21 is preferably provided between the bushing 19 and bushing 20. The bushing 19 is removably mounted in the valve stem tube by a snap ring 22 received in an annular groove in the outer end of tube 11 and abutting a bronze washer 23 which bears against the end of bushing 19. The lower end of bushing 20 abuts a shoulder 25 on the end of valve stem 13 and the shouldered end of the stem fits into a socket 26 in the ball 14. Preferably, the stem is keyed to the ball by pins 27, so that there can be no relative movement between the ball and the stem.

Diametrically opposite to socket 26 is a socket 28 in the ball which has a bearing bushing 29 in which a trunnion 30 is journaled. The trunnion extends through the tube 10, and a cover plate 31 is secured by screws 32 on the tube over the outer end of the trunnion. An O-ring 33 may be provided in the trunnion to provide a seal between the trunnion and the opening in the tube 10 in which it fits.

The flange portions 17 preferably have spherical seating surfaces 34 and 35 which substantially conform to the outer surface of the ball 14, and internal shoulders 36 on the body tube 10 abut the flange portions 17 to leave a slight clearance between the ball and the surfaces 34 and 35, for a purpose to be described. Teflon thrust washers 14A and 14B are preferably provided between the ball and body tube 10 surrounding the sockets 26 and 28.

The improved sealing construction for the ball comprises resilient O-rings 39A and 39B of relatively large cross section positioned in annular grooves 40A and 40B in the outer surface of the ball. The grooves 40A and 40B are preferably rectangular in cross section where the rings 39A and 39B are circular in cross section, and the grooves surround the inner ends of the tubes 15A and 15B, respectively, in the fully closed position of the ball shown in FIGURE 1, with the inner peripheral portion of the ring and its groove exposed within the tube. As shown, about two-thirds of the width of O-rings 39A and 39B lie within the flow tubes 15A and 15B, respectively.

Each O-ring 39A and 39B preferably has a circumferential length substantially less than that of its groove 40A or 40B, so that when the ring is within the groove it is in a longitudinally stretched condition, which aids materially in holding the ring in its groove under operating conditions. The cross section of the rings is such that the ring is mechanically deformed between the walls of its groove and the surface of the adjoining seating surface 34 or 35, so as to provide a tight seal between the ball and the seating rings.

The O-ring seals 39A and 39B are maintained in stretched condition in their grooves by retaining rings or plates which overlap part of the exposed portions of the ring seals and are applied or removed through flow tubes. Because of the slight clearance maintained between seating surfaces 34 and 35 and the ball at all times, the seal is wholly between the O-rings 39A and 39B and the ball, so that corrosion of the ball or the surfaces 34 and 35 has no effect on the seal.

The O-ring 39A is preferably retained in its grooves by a retainer ring 42 which surrounds a boss 43 on the ball, and the retainer ring is held in place by a snap ring 44 fitting in a groove in the boss. The outer periphery of ring 42 overlaps a substantial portion of the exposed periphery of O-ring 39A. The boss 43 may have a spherical outer surface of the same diameter as the ball for conforming to the seating surfaces 34 and 35 with slight clearance as the ball is rotated.

An alternate means for retaining the O-rings in their grooves in the ball is shown applied to ring 39B. In this case a circular retainer plate 45 having a spherical outer surface of the same diameter as the ball is attached to the ball by a set screw 46. The outer rim of the plate 45 overlaps a substantial portion of the periphery of the O-ring 39B.

When the ball is in fully closed position, the inlet pressure pushes against the exposed portion of the O-ring 39A and forces it more tightly against the radially outer walls of the groove 40A and the adjoining seating surface 34. This provides a highly effective seal under high pressures, because the higher the pressure the tighter the seal. Since the O-ring 39B is on the ball, it is not exposed to the scouring action of the fluid flowing through the valve when the valve is in partly open position, as it is on the downstream side when the O-ring is in the body.

In assembling the ball valve, the ball and stem assembly without the O-rings 39A and 39B is positioned within the central body tube 10, the stem being inserted through the bushing 20 with the bushing 19 and O-ring 21 removed, and trunnion 30 being inserted through the body 10 into bushing 29 within socket 28. Next, the flow tubes 15A and 15B are telescoped into the ends of the tube 10 until the ends of the tubes abut shoulders 36. Then, while suitably clamping the tubes 15A and 15B to hold them against the shoulders and the seating surfaces tightly against the O-ring seals 39A and 39B, with the tubes in exact alignment with the flow port 50 of the ball, the welds 16A and 16B are made.

After welding is completed, the O-ring 21 is inserted around the stem, followed by the bushing 19, washer 23 and snap ring 22. Then the O-ring seals 39A and 39B are inserted into the grooves 40A and 40B. Accordingly, neither O-ring 21 nor the ball-sealing rings 39A and 39B are subjected to the heat of welding, and the use of a coolant during the welding operation is not required.

In the ball valve shown in FIG. 3, the valve body preferably comprises a central tube 110 which is welded to, and curved radially outward from, the flow tubes 115A and 115B, and tube 110 has diametrically opposite openings, one for receiving the valve stem mounting sleeve 111 and the other for receiving the trunnion mounting sleeve 106. After the ball 114, trunnion 130 and stem 113 are assembled within the body in the manner to be described, the sleeves 106 and 111 are welded to the tube 110 circumferentially at 116A and 116B.

The flow tubes 115A and 115B have cylindrical portions 117 at their inner ends provided with spherical surfaces 134 and 135 substantially conforming to the outer surface of the ball, while leaving a slight clearance around the ball, as shown in FIGS. 3 and 4.

The stem 113 is journaled in a Teflon bearing sleeve 113' in a gland bushing 107 having a threaded portion 108 screwed into the sleeve 111 and a flatted nut portion 109 on its outer end to be engaged by a wrench. The portion 109 is threaded between flats and an annular cap 112 is screwed thereon and journaled on the stem 113. Preferably, an O-ring 112' is provided in the cap surrounding the stem, and an O-ring 112A is provided between the cap and the mounting sleeve 111.

The lower end of bushing 107 abuts a Teflon washer on a shoulder 125 on the end of the valve stem which fits into a socket 126 in the ball 114, and is keyed to the ball by pins 127. The shouldered end of the stem preferably has an O-ring 125A therein abutting the sleeve 111, and an O-ring 125B abutting the socket 126 in the ball. A vent 125' prevents entrapment of fluid in socket 126 during assembly.

The trunnion 130 fits into a socket 128 in the ball diametrically opposite to the socket 126 and bottoms against a Teflon gasket 128' in the socket. The trunnion has a threaded portion 131 screwed into sleeve 106, and a flatted nut portion 132 on its outer end. The portion 132 is threaded between flats and a cap 133 is screwed thereon covering the axial relief vent 137 in the trunnion. Preferably, an O-ring 130' surrounds the trunnion within sleeve 106, and an O-ring 130A surrounds the trunnion within ball socket 128. Also, an O-ring 133A is provided between the cap 133 and the sleeve 106.

The adjustable trunnion 130, and the adjustable bushing 107 around the stem, provide means for centering the ball transversely of the aligned flow tubes 115A and 115B to maintain equal clearance between the ball and all seating surfaces.

The sealing construction for the ball 114 comprises resilient O-rings 139A and 139B of relatively large cross section positioned in annular grooves 140A and 140B in the outer surface of the ball. As shown, the grooves are positioned so that in the fully closed position of the ball they surround the inner ends of flow tubes 115A and 115B, with the inner peripheral portions of the grooves overlapping into the flow ducts.

Preferably, the bottoms 141 of the grooves are flat and substantially tangential to the adjacent spherical seating surfaces 134 and 135, to provide back-up surfaces for the rings directly opposite to the seating surfaces.

O-rings 139A and 139B are maintained in their grooves by retaining plates 142 having a diameter slightly less than the flow ducts so that the plates can be applied or removed through the flow tubes, and the outer peripheries of the plates 142 overlap the inner peripheries of the grooves 140A and 140B. Preferably, retaining rings 143A and 143B are interposed between the outer peripheries of the plates 142 and the inner peripheral portions of the rings 139A and 139B, and these rings extend radially outward within the seating surfaces 134 and 135, so as to leave only a narrow peripheral portion of the rings exposed and in abutment with the adjoining seating surface. Thus, the O-rings 139A and 139B are prevented by rings 143A and 143B from being blown out of their grooves 140A and 140B when the rings cross the flow ducts during opening or closing of the ball valve.

The retaining rings 143A and 143B are of flexible, durable material, such as Teflon or other suitable plastic, so that they can be distorted sufficiently to be applied or removed through the flow tubes (with plates 142 removed) even though their outer diameters are normally greater than that of the flow ducts.

Because of the slight clearance maintained between the ball and seating surfaces 134 and 135 at all times, the seal is wholly between the O-rings 139A and 139B and the ball so that corrosion of the ball or the seating surfaces has no effect upon the seal. Vents 144 may be provided in the ball to provide communication between the valve cavity and the O-ring grooves 140A and 140B, to produce a differential pressure on the O-rings and prevent the line pressure from forcing them out of the groove when crossing the flow ports. Similarly, vents 144' provide communication between the grooves 140A and 140B and the flow tubes 115A and 115B, respectively.

The shape of the grooves 140A and 140B, as best shown in FIG. 4, is narrowed toward the vent 144, so that the pressure differential caused by vents 144 and 144' will tend to force the ring seal into the narrowed portion of the groove, and restrain the exposed portion of the ring seal from undue bulging as it crosses the flow port.

In assembling the ball valve of FIG. 3, the ball 114 (without the O-rings 139A and 139B) is positioned between the flow tubes 115A and 115B, with clearance between the ball and the seating surfaces 134 and 135, and the flow port 150 of the ball aligned with the tubes. While holding the flow tubes in aligned position, the trunnion 130 and mounting sleeve 106 are inserted, and the stem 113 and its mounting sleeve 111 and bushing 107 inserted in a diametrically opposite position with the pins 127 keyed into the ball. At this time, the O-rings 130A and 130' are omitted from the trunnion, and the O-rings 125A and 125B are omitted from the stem.

The stem bushing 107 and the trunnion 130 may now be adjusted to align the ball transversely, and while clamping the parts in proper assembled relation, the welds 116A and 116B are made. Next, the O-rings 139A and 139B may be inserted into the grooves 140A and 140B, followed by the retaining rings 143A and 143B and the retaining plates 142. Now the trunnion 130 may be unscrewed, the O-rings 130A and 130' inserted and the trunnion replaced. Similarly, the stem sleeve 107 is unscrewed, the stem removed and O-rings 125A and 125B inserted and the stem replaced. Caps 112 and 133 are then screwed in place to lock the sleeve 107 and trunnion 130 in place.

Accordingly, neither the O-ring seals for the ball nor any of the trunnion and stem O-rings are subjected to the heat of welding.

The modified seating construction shown in FIG. 5 comprises separate seating rings 160 abutting the ring seals 139A and 139B, and having shouldered portions 161 interfitting the inner ends of flow tubes 115A and 115B. Ring seals 162 are provided between the flow tubes and the seating rings, and split retainer rings 163 are insertable through the flow tubes to hold the seals 162 in place. Relief from increased pressure in the valve cavity due to expansion may occur by flow from the cavity past the ring seals 162 into the flow tube.

In the modified ball valve construction shown in FIG. 6, the inner end of the valve stem 213 has a key 251 which extends into the keyway 252 of the ball 214, and an annular shoulder on the key bears against a washer 254 of Teflon or the like, which in turn bears against the flanged bushing 220. A similar keyway 252' may be provided in the opposite side of the ball to make it reversible. The upward thrust of the ball on bearing washer 254 is taken by a bearing washer 255 interposed between the bushing 220 and the annular shoulder 256 in the valve stem tube 211. The keyway 252 is at right angles to the flow passageway 250 of the ball, so that when the ball is in fully closed position, as in FIG. 5, the line pressure on one side of the ball tends to force it against the seat on the opposite side.

Seating rings 234 and 235 are positioned within the annular flanges 217 of the flow tubes 215A and 215B, respectively, and the inner surfaces of the seating rings are spherically curved to conform to the exterior surface of the ball 214. Preferably, the seating rings 234 and 235 are backed up by substantially flat resilient gaskets 257 of plastic material such as Teflon, these gaskets being interposed between the rings and the flow tubes 215A and 215B. The metal of the rings and flow tubes may have shallow serrations contacting opposite sides of the gaskets 257 so that the rings have slight yielding movement to compensate for movement of the ball under pressure, and for expansion and contraction of the metal parts during welding.

Radially inward of the gaskets 257, the joints between the seating rings 234 and 235 and the tubes 215A and 215B are further sealed by O-rings 258 positioned in annular grooves. The O-rings 258 may be inserted after assembly of the valve and are held in place by split retainer rings 259 fitting in inner annular grooves in the joints between the seating rings and the flow tubes.

The resilient O-rings 239A and 239B and their grooves 240A and 240B surround the inner ends of the flow tubes 215A and 215B, respectively, in the fully closed position of the ball, with about one-third of the rings exposed within the tubes. The rings are in longitudinally stretched condition, and the cross section of the rings is such as to be mechanically deformed within the walls of their grooves to provide a tight seal between the ball and the seating rings.

It may be desirable to provide a vent 260 in seating ring 235 connecting the radially outer corner of groove 240B with flow tube 215B, to prevent pressure seepage under high pressures from the cavity around the ball from deforming the ring 239B to an extent which would cause it to be damaged as it crosses the flow port when the ball is rotated.

By exposing approximately one-third of the O-rings 239A and 239B within the flow ports, the O-rings may be inserted through the flow tubes 215A and 215B after the valve is fully assembled and welded. Thus, by turning the ball slightly from its fully closed position, a portion of the circumferential length of the O-ring grooves is exposed so that a corresponding portion of the ring can be inserted and then stretched and progressively worked into the groove as the ball is turned slightly in the opposite direction. In the same manner a ring can be replaced as it becomes worn.

Due to the imperfectness of the seal provided by the O-ring 239B on the downstream side under high pressure conditions, it is desirable to supplement the O-ring seal by a lubricant seal surrounding the O-ring. Accordingly, an annular lubricant groove 261B is provided in the outer surface of the ball wholly in contact with the spherical surface of seating ring 235. This groove is connected, by a passageway 262B extending inwardly of the ball, with a supply duct 263 axially aligned with the valve stem 213. A similar passageway 262A connects the supply duct 263 with a lubricant groove 261A surrounding the O-ring 139A and contacting the seating ring 234. The groove 261A would become desirable if flow through the valve were reversed.

Preferably, lubricant is fed to the supply duct 263 through an axial bore 265 in the stem 213. The bore may have a check valve 266 therein to prevent reverse flow of the lubricant. A lubricant-tight seal is provided between the stem and the ball by a bulbous tube 267 having spherical surfaces slidably contacting the enlarged bore of the stem and a socket 268 in the ball communicating with the duct 264.

The upper end of tube 267 seals against a Teflon washer 269 backed up by a metal washer 270 and spring 271, and the lower end of tube 267 seals against a Teflon washer 272 in the bottom of socket 268 in the ball. The spherical surfaces of the tube 267 allow it to act similarly to a universal joint and permit relative movement of the ball and stem while maintaining a lubricant-tight seal between the ball and stem.

In the event that the inlet pressure is insufficient to provide a leakproof seal between the O-ring 239A and the seating ring 234, the axial movement of the ball due to inlet pressure will increase the effectiveness of the seal between the O-ring 239B and the seating ring 235 on the downstream side, so as to provide a leakproof seal. Thus, a leakproof seal is provided on the upstream side under high pressure and on the downstream side under low pressure.

Obviously, the O-ring seal arrangement shown in FIG. 6 can be applied to the trunnion mounted balls of FIGS. 1–5, and the O-ring seal arrangement of FIGS. 1–5 can be used on an axially movable ball.

In all forms of the invention, the O-ring seals can be inserted into or removed from their grooves through the flow ports of the valve after the valve is assembled and welded together.

The term "O-ring" as applied to the ring seals 39A and 39B, 139A and 139B, and 239A and 239B, is understood to include ring seals of various non-circular cross sections and grooves having varying cross sections designed to fit the rings in such manner as to make an effective seal between the rings and the seating surfaces abutting the rings.

What is claimed is:

1. A ball valve having a body, aligned inlet and outlet tubes welded to said body and having seating surfaces at their inner ends, a rotatable ball shut-off having a flow passage therethrough and a transversely extending stem journaled in said body, annular grooves in said ball surrounding the inner ends of said inlet and outlet tubes in the fully closed position of the ball with the groove openings at least partly within the seating surfaces on said tubes, resilient ring seals insertable through said tubes into said grooves and having exposed portions to make seals against said seating surfaces, and retaining means insertable through the tubes for holding said ring seals in said grooves.

2. A ball valve having a body, aligned inlet and outlet tubes welded to said body and having seating surfaces at their inner ends, a ball shut-off having a transversely extending stem journaled in said body, a trunnion diametrically opposite said stem mounting said ball for rotation on the stem axis with a clearance between the ball and said seating surfaces, annular grooves in said ball surrounding the inner ends of said inlet and outlet tubes in the fully closed position of said ball, the inner peripheries of said grooves being exposed within said tubes, resilient ring seals insertable through said tubes and fitting in said grooves to seal against said seating surfaces, and retaining means of less diameter than said tubes for engaging the inner peripheral portions of said ring seals to hold them in said grooves.

3. In a ball valve having registering inlet and outlet ducts with a valve chamber between the inner ends of said ducts, a ball having a flow passage therethrough rotatably mounted in said chamber, and annular seating surfaces at the inner ends of said ducts conforming to said ball, sealing means comprising an annular groove in the outer surface of the ball, said groove in the fully closed position of the ball having its opening surrounding the inner end of said inlet duct at least partly within the adjoining seating surface and with its inner peripheral portion exposed within said duct, a resilient ring seal fitting in said groove, said ring seal having its exposed portion dimensioned to make a seal between the walls of said groove and the adjoining seating surface in the fully closed position of the ball, a flexible retaining ring radially overlapping the inner peripheral exposed portion of said ring seal and extending radially within the seating surface at the inner end of said inlet duct and insertable through said inlet duct, a retaining plate of less diameter than said duct overlapping the inner periphery of said retaining ring, and means accessible through said duct detachably mounting said plate on said ball to press said retaining ring against said ring seal.

4. In a ball valve having a body and registering inlet and outlet ducts welded to the body forming a valve chamber between the inner ends of said ducts, a ball having a flow passage therethrough rotatably mounted in said chamber, and annular seating surfaces at the inner ends of said ducts conforming to said ball, sealing means comprising an annular groove in the outer surface of the ball, said groove in the fully closed position of the ball surrounding the inner end of said inlet duct partly within the adjoining seating surface and with its inner peripheral portion exposed within said duct, a resilient ring seal fitting in said groove, said ring seal being dimensioned to make a seal between the walls of said groove and the adjoining seating surface in the fully closed position of the ball, a retaining plate of less diameter than said inlet duct, and means accessible through said duct detachably mounting said plate on said ball with the rim of said plate holding said ring seal in said groove.

5. In a ball valve having registering inlet and outlet ducts with a valve chamber between the inner ends of said ducts, a ball having a flow passage therethrough rotatably mounted in said chamber, and annular seating surfaces at the inner ends of said ducts conforming to said ball, sealing means comprising an annular groove in the outer surface of the ball, said groove in the fully closed position of the ball surrounding the inner end of said inlet duct partly within the adjoining seating surface and with its inner peripheral portion exposed within said duct, a resilient ring seal fitting in said groove, said ring seal being dimensioned to make a seal between the walls of said groove and the adjoining seating surface in the fully closed position of the ball, a flexible retaining ring overlapping the inner peripheral portion of said ring seal and extending radially within the seating surface at the inner end of said inlet duct and insertable through said inlet duct, a retaining plate of less diameter than said duct overlapping the inner periphery of said retaining ring, and means accessible through said duct detachably mounting said plate on said ball to press said retaining ring against said ring seal.

6. In a ball valve having registering inlet and outlet ducts with a valve chamber between the inner ends of said ducts, a ball having a flow passage therethrough rotatably mounted in said chamber, and annular seating surfaces at the inner ends of said ducts conforming to said ball, sealing means comprising an annular groove in the outer surface of the ball, said groove in the fully closed position of the ball surrounding the inner end of said inlet duct partly within the adjoining seating surface and with its inner peripheral portion exposed within said duct, a resilient ring seal fitting in said groove, a flexible retaining ring insertable through said inlet duct and extending radially into said groove to contact the adjoining seating surface and overlap the inner peripheral portion of said ring seal, a retaining plate of less diameter than said duct overlapping the inner periphery of said ring and having a shoulder engaging its inner periphery and closing the inner periphery of said annular groove, and means accessible through said inlet duct detachably mounting said plate on said ball.

7. A ball valve having a body, aligned inlet and outlet tubes welded to said body and having seating surfaces at their inner ends, a ball shut-off having a transversely extending stem journaled in said body, a trunnion diametrically opposite said stem mounting said ball for rotation on the stem axis with a celarance between the ball and said seating surfaces, annular grooves in said ball surrounding the inner ends of said inlet and outlet tubes in the fully closed position of said ball, the inner peripheries of said grooves being exposed within said tubes, resilient ring seals insertable through said tubes and fitting in said grooves to seal against said seating surfaces, flexible retaining rings insertable through said tubes and extending radially into said grooves to overlap the inner peripheries of said ring seals, and retaining plates insertable through said tubes detachably mounted on said ball with the rims of the plates overlapping the inner peripheries of said retaining rings.

8. A ball valve having a body, aligned inlet and outlet tubes welded to said body and having seating surfaces at their inner ends, a ball shut-off having a transversely extending stem removably journaled in said body, a trunnion diametrically opposite said stem removable from said body and mounting said ball for rotation on the stem axis with a clearance between the ball and said seating surfaces, annular grooves in said ball surrounding the inner ends of said inlet and outlet tubes in the fully closed position of said ball, the inner peripheries of said grooves being exposed within said tubes, resilient ring seals insertable through said tubes and fitting in said grooves to seal against said seating surfaces, and retaining plates insertable through said tubes detachably mounted on said ball with the rims of the plates holding said ring seals in said grooves.

9. A ball valve having a body, aligned inlet and outlet tubes welded to said body and having seating surfaces at their inner ends, a ball shut-off having a transversely extending stem removably journaled in said body, a trunnion diametrically opposite said stem removable from said body and mounting said ball for rotation on the stem axis with a clearance between the ball and said seating surfaces, annular grooves in said ball surrounding the inner ends of said inlet and outlet tubes in the fully closed position of said ball, the inner peripheries of said grooves being exposed within said tubes, resilient ring seals insertable through said tubes and fitting in said grooves to seal against said seating surfaces, flexible retaining rings insertable through said tubes and extending radially into said grooves to overlap the inner peripheries of said ring seals, and retaining plates insertable through said tubes detachably mounted on said ball with the rims of the plates overlapping the inner peripheries of said retaining rings.

References Cited in the file of this patent

UNITED STATES PATENTS

| | | |
|---|---|---|
| 2,233,074 | Corbin | Feb. 25, 1941 |
| 2,235,307 | Atkinson | Mar. 18, 1941 |
| 2,510,514 | Mueller | June 6, 1950 |
| 2,734,715 | Knox | Feb. 14, 1956 |
| 2,788,017 | Scherer | Apr. 9, 1957 |
| 2,857,130 | Brisbane | Oct. 21, 1958 |
| 2,882,010 | Bryant | Apr. 14, 1959 |
| 2,889,134 | Bryant | June 2, 1959 |
| 2,890,017 | Shafer | June 9, 1959 |
| 2,945,669 | Gallagher | July 19, 1960 |
| 2,963,262 | Shafer | Dec. 6, 1960 |
| 2,970,805 | Pool | Feb. 7, 1961 |
| 2,979,071 | Herring | Apr. 11, 1961 |

FOREIGN PATENTS

| | | |
|---|---|---|
| 1,054,711 | France | Oct. 7, 1953 |
| 1,064,582 | France | Dec. 23, 1953 |
| 824,649 | Great Britain | Dec. 2, 1959 |